United States Patent [19]

Honigsbaum

[11] 4,193,271
[45] Mar. 18, 1980

[54] AIR CONDITIONING SYSTEM HAVING CONTROLLABLY COUPLED THERMAL STORAGE CAPABILITY

[76] Inventor: Richard F. Honigsbaum, 21 A Barry Gardens, Passaic, N.J. 07055

[21] Appl. No.: 813,471

[22] Filed: Jul. 7, 1977

[51] Int. Cl.² .................... F25D 17/00; B60H 3/04
[52] U.S. Cl. ........................... 62/180; 62/96; 62/244; 62/437; 165/104 S
[58] Field of Search ............ 62/437, 430, 180, 59, 62/96, 243, 244; 165/104 S

[56] References Cited

U.S. PATENT DOCUMENTS

| | | | |
|---|---|---|---|
| 2,052,014 | 8/1936 | Chamberlain | 62/59 X |
| 2,170,992 | 8/1939 | Grady | 62/439 X |
| 2,188,349 | 1/1940 | Heideman | 62/439 X |
| 2,193,836 | 3/1940 | Winther | 62/95 X |
| 2,241,411 | 5/1941 | McGuffey | 62/430 X |
| 2,308,079 | 1/1943 | Henney | 62/430 |
| 2,742,765 | 4/1956 | Anderson | 62/244 X |
| 2,780,077 | 2/1957 | Jacobs | 62/244 |
| 2,783,622 | 3/1957 | Bourassa | 62/244 X |
| 2,846,421 | 8/1958 | Pollock | 165/204 S |
| 2,884,768 | 5/1959 | Gould | 165/104 S |
| 3,293,409 | 12/1966 | Snelling | 165/104 S |
| 3,546,893 | 12/1970 | Frudeger | 62/180 X |
| 3,585,812 | 6/1971 | Parker | 62/180 |
| 3,743,782 | 7/1973 | Laing | 165/104 S |
| 3,766,752 | 10/1973 | Laing | 62/59 X |
| 3,773,031 | 11/1973 | Laing et al. | 62/430 X |

FOREIGN PATENT DOCUMENTS

| | | | |
|---|---|---|---|
| 248397 | 9/1962 | Australia | 62/430 |
| 1451251 | 3/1969 | Fed. Rep. of Germany | 165/104 S |
| 2552698 | 6/1977 | Fed. Rep. of Germany | 165/104 S |

*Primary Examiner*—Leslie Braun
*Attorney, Agent, or Firm*—Hubbell, Cohen, Stiefel & Gross

[57] ABSTRACT

An improved air conditioning system comprises a first medium in heat exchange relation with an air stream, means for controlling the temperature of the first medium to effect sufficient heat exchange to control the temperature of the air stream, a second medium having thermal storage capacity, thermal conducting means interposed between said first and second media for effecting heat exchange therebetween, the thermal conducting means being thermally coupled to a means for exchanging heat with the air stream, and a means for controlling the flow rate of the air stream through the heat exchange means in order to controllably apportion heat exchange between (a) the first medium and (b) the air stream and the second medium.

The system also includes, as additions to the conventional sensors and controls, means for sensing the level of thermal storage effected by the second medium and providing an output signal indicative thereof, cycling means for activating the temperature control means in response to these sensing means output signals, and, for vehicular applications, means for sensing and cycling on the basis of vehicle operating mode.

34 Claims, 5 Drawing Figures

AIR CONDITIONING SYSTEM HAVING CONTROLLABLY COUPLED THERMAL STORAGE CAPABILITY

BACKGROUND OF THE INVENTION

1. Field of the Invention

This invention relates to air conditioning systems and more particularly to air conditioning systems having thermal storage capacity.

2. Prior Art

As automobiles and engines are made smaller in response to the increasing price and decreasing availability of fuel, the burden of the car air conditioner with respect to fuel economy and vehicular performance becomes more pronounced.

Air conditioner evaporators should be held at temperatures low enough to prevent reevaporation of condensed moisture and the discomfort in the conditioned space resulting therefrom, but high enough to prevent icing. In most automobile air conditioners these system requirements are met by running the compressor "continuously", and throttling the vapor exiting the evaporator to the extent necessary to prevent icing. This mode of operation has the desired effect, but results in substantial energy waste because under these conditions the compressor does additional work because of the throttling, and almost as much additional fuel is consumed in operating the air conditioner on a mild day as on a hot one. In those air conditioners which do not operate in this mode, but instead cycle the compressor during periods of light load, evaporator temperatures rise during periods of compressor shutdown. As explained above, this results in reevaporation of the moisture condensed on the evaporator and the discomfort associated with this humidity change. Moreover, even in this latter mode of operation the compressor will often be on in response to heavy cooling loads during periods when there is already an increased demand on the engine due, for example, to hill climbing or acceleration. During such periods the additional load imposed on the engine by the compressor seriously impairs vehicular performance, particularly in cars equipped with small engines.

It is thus apparent that an automobile air conditioner with thermal storage capability may be effectively employed to improve both fuel economy and vehicular performance since it can be cycled without noticeably affecting cooling. In addition, during periods of compressor shutdown, cooling from the thermal storage elements may be employed to maintain evaporator temperatures below levels associated with reevaporation of condensed moisture.

In the past, others have suggested the possibility of introducing some form of thermal storage capability into an air treatment system. Thus, U.S. Pat. No. 2,170,992 issued to Grady discloses an air conditioning system having thermal storage capability particularly adapted for use in an automobile air conditioning system. The system disclosed by Grady employs a single evaporator in which a heat-of-fusion thermal storage medium is disposed in surrounding relation with the evaporator refrigerant coil, and thus interposed between these coils and the air stream. While this arrangement does provide the desired thermal storage, cooling during periods of occasional use is delayed since the thermal storage medium must be cooled before effective air cooling will occur. This delay is particularly objectionable in automobiles and other applications where a substantially instantaneous stream of cool air is expected. A further disadvantage of the system disclosed by Grady is that the interposed medium constitutes an additional thermal resistance between the refrigerant and the air to be cooled. The result is that lower refrigerant temperatures are required to effect sufficient heat transfer from the air. This in turn results in reduced air conditioner efficiency and capacity.

U.S. Pat. No. 2,193,836 issued to Winther discloses an air conditioning system having thermal storage capability which employs two separate evaporators. One of the evaporators plays the conventional role while the other effects thermal storage for use during periods of light loads. Thus, Winther's system is advantageous insofar as it provides the expected substantially instantaneous cooling during occasional use. However, the cost and complexity of this system make it unattractive for use in motor vehicles and other applications.

U.S. Pat. No. 2,308,079 issued to Henney also discloses an air conditioning system having thermal storage capability which employs separate evaporators. Thus, like Winther's system, it is also unattractive for use in motor vehicles and other applications where cost reduction and system simplification are major objectives.

U.S. Pat. No. 3,293,409 issued to Snelling discloses an electric base board heat storage unit in which the heating element is disposed in thermal conducting relation with a heat storage element. Air to be heated is circulated through the base board unit across both elements such that during periods when the electric heating element is off, the circulated air will nevertheless contact the heat storage element thus heating the air and preventing the wide temperature variations normally present in thermostatically controlled electrical heating systems. However, this particular system is not well suited for applications such as motor vehicles where only occasional heating (or cooling) is required since, like Grady's system, it suffers from the inability to provide instantaneous heating (or cooling). This is so since the rate of heat transfer between the electric heating element and the thermal storage element is constant. Thus, during start up, the heating element must first heat the thermal storage element before maximum heat transfer to the circulating air may be effected.

U.S. Pat. No. 2,188,349 issued to Heideman discloses an air conditioning system having thermal storage capability which employs a single evaporator submerged in a freezable liquid. Thus, this system is quite similar to that disclosed by Grady and consequently possesses the same drawbacks. A similar system having similar drawbacks is disclosed in U.S. Pat. No. 2,752,763 issued to Shepard which discloses a beverage cooling apparatus having thermal storage capability.

SUMMARY OF THE INVENTION

According to the present invention I have developed an air conditioning systems having thermal storage capability which employs a single evaporator but is nevertheless capable of providing substantially instantaneous cooling during occasional use.

According to a preferred embodiment of the invention, a coil containing a thermal storage medium is thermally coupled to a conventional evaporator coil. Preferably, coupling is accomplished by a plurality of fins which engage the juxtaposed turns of the two coils. The preferred system also includes an adjustable speed fan which blows the air stream to be cooled between the fins and the coils. Thus the fins serve the dual role of coupling the coils and exchanging heat with the air stream. The adjustable speed fan also serves to control the effective thermal coupling between the conventional evaporator coil and the thermal storage coil. This effect occurs between the rate at which heat is removed from the air stream is, amongst other things a function of the air stream velocity which is, in this embodiment, a function of fan speed, and during periods of high fan speed heat removal from the air will be favored. However, during periods of low fan speed comparatively less heat will be removed from the air stream, thereby favoring increased heat transfer between the evaporator coil and the thermal storage coil via the interconnecting fins.

During periods when instantaneous cooling is desired, which generally occur when the air conditioning system is initially activated, fan speeds will normally be high, thus favoring increased heat removal from the air. During periods when cooling demand is below system capacity, fan speeds will be low and cooling from the coil will serve to cool the thermal storage medium. Once sufficient thermal storage is effected, the compressor can be stopped and the air cooled by transferring heat to the thermal storage medium. During such periods no additional engine fuel is required to drive the compressor, and the net result is one of substantial fuel savings because the compressor is either operating at full capacity or is stopped, and much, if not all, of the fuel used to operate a conventional system in the throttling mode described earlier is saved.

The compressor can also be stopped for reasons related to vehicular performance, for example during hill climbing or acceleration, when it is desired to channel all available engine output into propelling the vehicle. During such periods the air stream will still be cooled by heat transfer to the thermal storage medium. Thus the previous mutually exclusive demands for comfort and performance are served simultaneously.

Also contemplated is deactivation of the compressor when the cooling capacity available from the thermal storage medium reaches a predetermined level beyond which additional storage is either impossible or unnecessary. Sensing means well known in the art may be employed for these purposes.

The thermal storage medium is subject to several restrictions, the most important being fusion temperature which should be sufficiently high with respect to the freezing temperature of water to prevent icing of the evaporator coil, but low enough to provide effective cooling during intervals when the compressor is inoperative, and to prevent reevaporation of condensed moisture from the evaporator.

In the preferred embodiment of the invention, the thermal storage medium is sealed in capsules which are in turn sealed into the previously evacuated thermal storage coil. Also disposed in the coil along with the capsules is a saturated vapor which provides effective thermal coupling between the capsules and the walls of the coil. This embodiment insures a rate of heat rejection from the thermal storage coil sufficient to satisfy the absorption rate of the refrigeration system without icing the evaporator. Also preferred is the sensing of the vapor pressure of the coupling medium as a basis for controlling the operation of the compressor and thereby controlling the state of the thermal storage medium.

Since compressor cylinder is a function of several variables it is appropriate to accommodate the situation where, on the basis of cooling capability in storage, the compressor would be turned on, but because engine output is required for other purposes this is not done. Such operation requires a storage controller which senses the level of storage and maintains some reserve and thus a thermal storage medium which completes its change of state over a range of temperatures, if the preferred saturated vapor pressure sensing is to be used. Such media are normally mixtures rather than pure substances and are elaborated upon later herein.

Also within the contemplation of the present invention is the use of means other than an adjustable speed fan to control the velocity of the air stream in order to provide the controllably coupled thermal storage capabilities described above. Thus, for example, the use of valves, shutters, diverters and other means are anticipated and may be needed in lieu of a second fan in air conditioning systems incorporating air blend and/or reheat.

These, as well as other additional features, modifications and advantages of the controllably coupled thermal storage air conditioning system of the present invention will now be more fully described with reference to the annexed drawings of the preferred embodiments thereof.

DETAILED DESCRIPTION OF THE PREFERRED EMBODIMENTS

Figure 1:
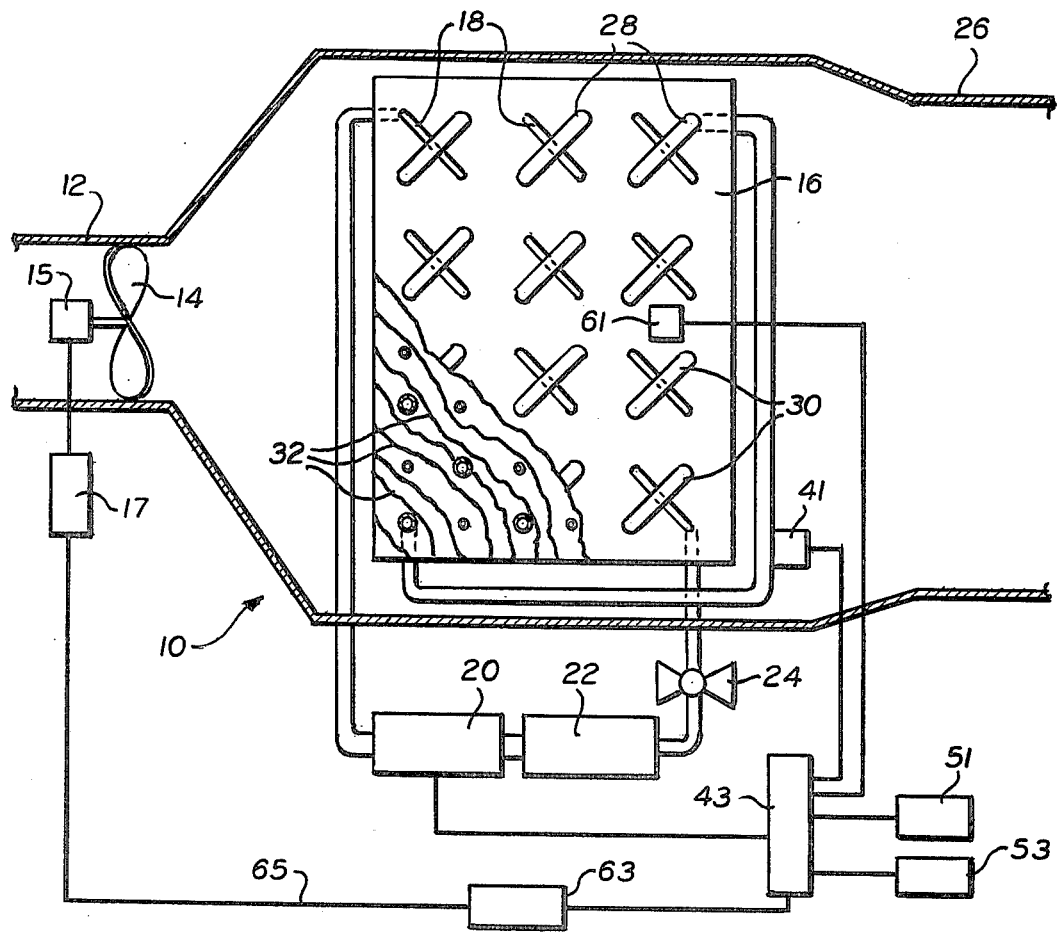
FIG. 1 is a diagrammatic view, partially broken away, of the preferred controllably coupled thermal storage air conditioning system in accordance with the present invention.

Referring initially to FIG. 1 in the drawings, the preferred air conditioning system having controllably coupled thermal storage capacity is generally designated by the reference numeral 10.

As is well known in conventional air conditioning systems, air to be cooled, which may be either outside air or return air or combinations thereof, passes through a duct 12 to a fan 14 driven by motor 15 which blows the air through an evaporator unit 16. The cooled air is then fed to the conditioned space by a supply duct 26.

The evaporator unit 16 illustrated in FIG. 1 includes a conventional tubular evaporator coil 18 which forms part of a conventional refrigeration system comprised of compressor 20, condenser 22 and expansion valve 24. As is well known, high pressure liquid refrigerant from the condenser 22 is metered by expansion valve 24 to a low pressure region 18, the pressure is which is maintained by compressor 20. The reduction in pressure results in vaporization of the refrigerant at temperatures low enough to effect cooling of the air which contacts fins 32. The vaporized refrigerant from the output of the coil 18 is then compressed by the compressor 20 and liquified in the condenser 22 thus completing the cycle. As will be more fully described hereinafter, and in accordance with the preferred embodiment of the present invention, evaporator unit 16 also includes an endless tubular coil 28 in which a suitable thermal storage medium 30 is enclosed. In other embodiments the thermal storage medium can be housed in parallel and/or discontinous tubular segments of coil 28.

Other items, eliminated for clarity of illustration, but familiar to persons skilled in the art include disposal means for the moisture which drips from the fins, receiver/dryer means to store liquid refrigerant and to remove moisture therefrom, and blend and/or reheat means for tempering the air which exits the evaporator. Such persons also recognize that arrangements in which expansion valves are replaced by capillary tubing may be preferred for particular applications.

Figure 2:
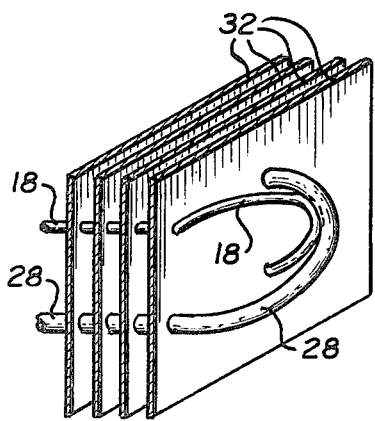
FIG. 2 is a fragmentary perspective view of the preferred evaporator unit for use when practicing the present invention.

As presently preferred and best shown in FIG. 2, the coils 18, 28 are arranged with their turns in juxtaposed relation. The coils 18, 28 are supported and thermally coupled by the planar fins 32 which are preferably oriented normal to the axes of the elongate portions of the coils 18, 28. Fins 32 should be comprised of a material having good thermal conductivity such as, for example, cooper or aluminum, and may be joined to the coils 18, 28 by any of a variety of techniques well known in the art such as, for example, soldering or brazing. In addition to providing thermal conductivity between the coils 18 and 28, the fins 32 also provide for heat exchange between the air to be cooled and the evaporator unit 16 as will be more fully explained hereinafter. As shown, the planes of the fins 32 are substantially parallel to the direction of air flow to permit the passage of air therebetween.

Referring again to FIG. 1, connected to the fan motor 15 is a conventional fan motor speed controller 17. Controller 17 controls the speed of the fan 14 thereby controlling the rate at which air flows through evaporator unit 16.

To describe the operation of the system 10 it will be assumed that the system 10 comprises an automobile air conditioning unit and that the unit 10 has been inactive for an extended period of time, e.g. overnight. When the user turns on the unit 10 by activating the compressor 20, refrigerant is vaporized in coil 18 as is more fully described above. The speed of the fan 14 is preferably initially set at maximum by the conventional fan motor speed controller 17. While operation of fan motor speed controller 17 may be accomplished manually as in conventional vehicular and room air conditioning systems, automatic controls, to be described in greater detail hereinafter, are preferably employed. With fan 14 set at maximum speed, air entering unit 10 from the duct 12 is blown rapidly across evaporator unit 16 where it is cooled as heat from the air stream is transferred to the refrigerant in coil 18 via the fins 32 and walls of the coil 18. Skilled art workers will recognize, however, that in addition to heat transferred to the refrigerant from the air stream, additional heat from the thermal storage medium 30 in coil 28 is simultaneously transferred to the refrigerant via the fins 32 and the walls of coil 18.

Thus, the cooling available as a consequence of vaporization of the refrigerant circulating through coil 18 is apportioned between thermal storage medium 30 and the air stream blown across the unit 16 by fan 14. Since the rate at which heat is removed from the air stream is a function of the air velocity, which, as explained previously, is a function of the fan speed, the relative amounts of heat transferred from the air stream and the thermal storage medium 30 to the refrigerant in coil 18 is also a function of fan speed. Thus, by initially setting the fan 14 at maximum speed by means of controller 17, the air from the duct 12 is blown rapidly across evaporator unit 16 with the result that the major portion of cooling capability of the refrigerant in coil 18 is employed in removing heat from the air stream with only minimal heat being removed from thermal storage medium 30. The result is that the conditioned space receives a substantially instantaneous stream of cool air from the unit 10.

As the unit 10 continues to operate, the conditioned space will eventually become sufficiently cooled and there will be excess cooling capacity available from the refrigerant in coil 18. When this occurs, the speed of the fan 14 is reduced by the fan motor speed controller 17 with the result that less heat from the air stream is transferred to the refrigerant in coil 18. It will thus be apparent that the operation of fan motor speed controller 17 may be controlled by a conventional thermostat-type comfort sensor 63 which senses the temperature of the conditioned space and reduces the fan speed when the temperature therein drops below a preselected level and increases the fan speed when the temperature exceeds this level. Additional controls to accommodate a multiplicity of fan speeds may also be provided. Since the construction of means for controlling the operation of fan 14 in the above-described manner are well within the capabilities of the skilled art worker, further description thereof is deemed unnecessary.

Since the refrigerant is capable of absorbing a relatively constant amount of heat at relatively constant compressor speed and condenser heat rejection rate, the reduction in heat transfer from the air stream caused by the reduced speed of fan 14 results in increased heat transfer from thermal storage medium 30 to the refrigerant, the excess of cooling capability over that needed to cool the air being diverted to storage in medium 30.

This process may continue until a preselected level of thermal storage has been achieved in medium 30. This may be sensed by a suitable sensor 41, examples of which will be more fully described hereinafter. The output from the sensor 41 may then be applied to a conventional cycling controller 43 which may comprise, for example, a clutch coil switch responsive to the output signal from sensor 41. The controller 43 would then stop compressor 20 when the signal from sensor 41 indicates that the preselected level of thermal storage has been achieved whereupon cooling of the air stream directed across the unit 16 will be accomplished by heat transfer from the air to the medium 30 via fins 32, rather then to the refrigerant in tubes 18. Thus, even though the compressor is stopped, the wide temperature variations that normally occur in conventional systems when the compressor is cycled are avoided. Additionally, the cooling supplied by the thermal storage medium 30 when the compressor is stopped maintains the evaporator unit 16 at a sufficiently low temperature to avoid reevaporation of condensed moisture. Thus, the system 10 insures cool air and low humidity in the conditioned space even during periods of compressor shut down. When the level of thermal storage drops to the predetermined level, the compressor is restarted by sensor 41 and controller 43 whereupon the air is again cooled by heat transfer to the refrigerant in coil 18, with excess capacity being diverted to storage in medium 30.

Figure 5:
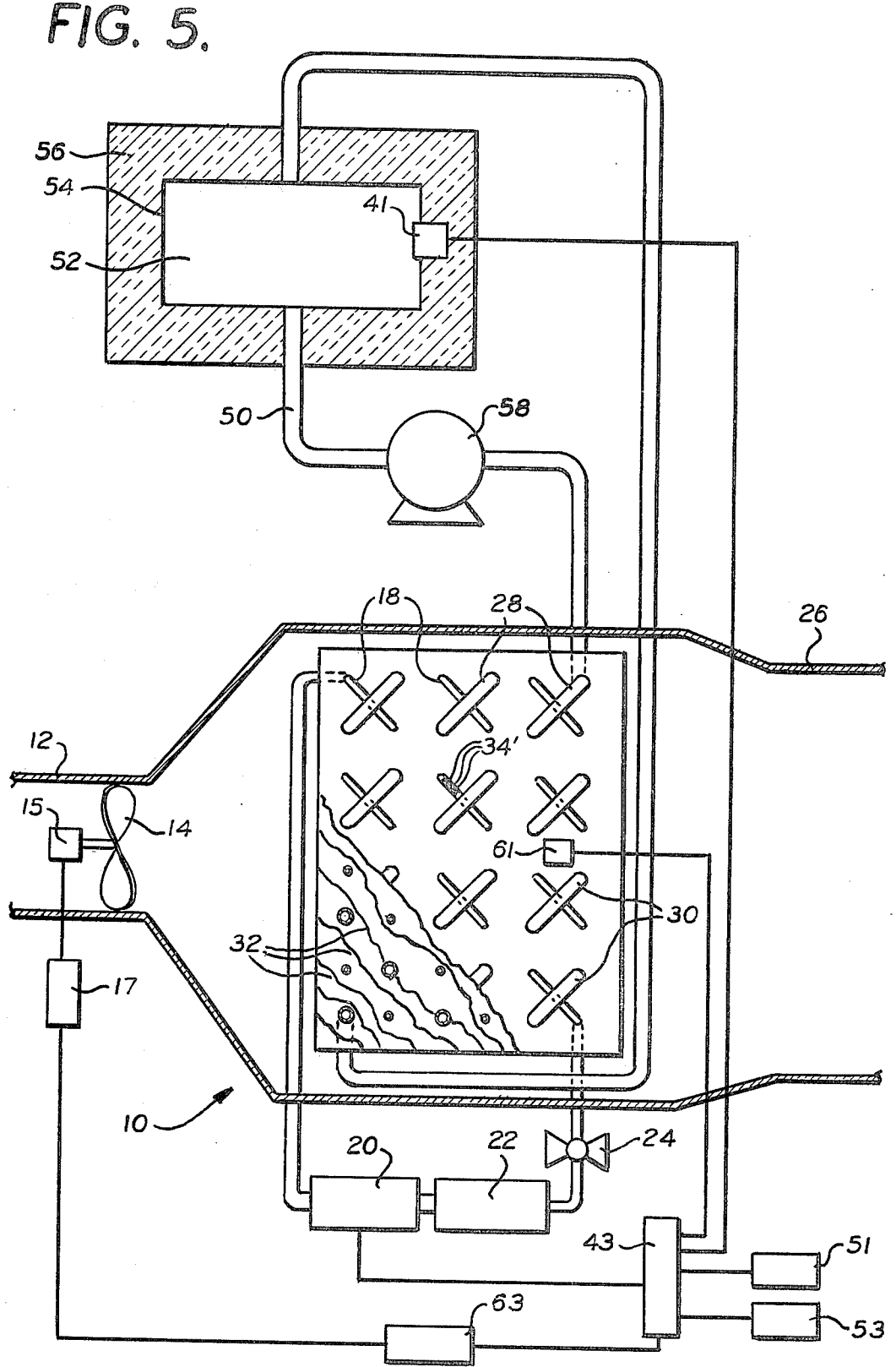
FIG. 5 is a diagrammatic view, partially broken away, of a modified air conditioning system in accordance with the present invention.

This kind of operation results in fuel savings as explained earlier, and such savings are maximized when the amount of thermal storage capacity is small when compared with the total amount of heat removed during an average period of air conditioning use. In the case of privately owned and operated passenger cars it is presently suggested that storage capacity be limited to about three minutes of cooling with the compressor inoperative; at least one-third of this capacity held in reserve to accommodate vehicular performance as explained earlier, and the remainder used for cycling for reasons of fuel economy. In commercial vehicles such as taxicabs, busses, and trucks, greater storage capacities may be appropriate. In special applications such as room air conditioners in regions where power rate structures discourage daytime use, large storage capability may be desirable. Special arrangements for such applications are illustrated by FIG. 5 and described in detail later herein.

The thermal storage and release described above is preferably effected by fusing and melting the thermal storage medium 30. The fusion temperature of the medium 30 must be sufficiently elevated with respect to the freezing temperature of water to prevent evaporator icing yet low enough so that cooling is effected during intervals when the compressor is inoperative. Other factors which should be considered when selecting a suitable thermal storage medium are vapor pressure, specific heat, viscosity, thermally induced volume change, toxicity, and cost. By cross referencing lists of compounds or mixtures and their properties, the skilled art worker can readily select thermal storage media suitable for practicing the present invention. On the basis of fusion temperature, heat of fusion and specific heat, one medium of interest is formic acid. Other potentially usable thermal storage media 30 include 1,2-Dibromoethane, m-Bromoidobenzene, Nitrobenzene, Benzene, Cyclohexane, and Pseudocumene.

In order for system 10 to be effective, it is obvious that the thermal storage medium 30 must reject heat at a rate substantially that of the heat absorption capacity of the refrigeration system, and, as noted above, must do so at evaporator temperatures which discourage icing. Since the temperature gradients under these conditions are low, the heat transfer areas must be large. Thus, the disposition of the thermal storage medium should be characterized by a large surface area-to-volume ratio. Clearly, such an arrangement would complicate the evaporator manufacturing process if the required ratio were obtained by the obvious means of adjusting the dimensions of the coil 18.

Figure 3:
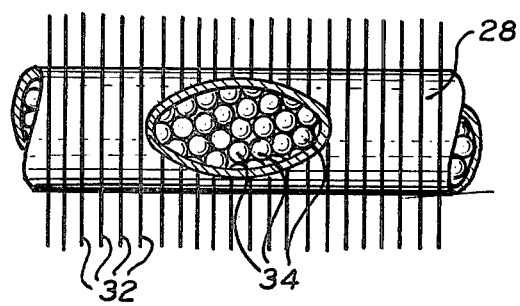
FIG. 3 is a fragmentary elevational view illustrating the preferred means for packaging the thermal storage medium.
Figure 4:
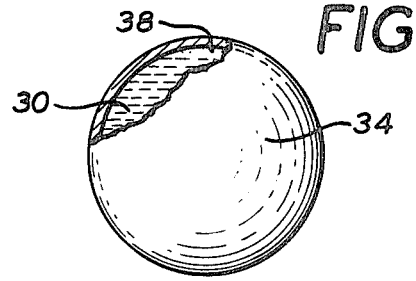
FIG. 4 is a elevational view, partly broken away, showing one of the capsules illustrated in FIG. 3 in greater detail.

With reference now to FIGS. 3 and 4, the preferred method of disposing the thermal storage medium within the coil 28, which method avoids the manufacturing problems mentioned above, is shown. In the embodiments of FIGS. 3 and 4, the thermal storage medium is sealed in preferably spherical capsules 34. These capsules are in turn sealed in the coil 28 preferably together with a saturated vapor. The vapor fills the voids between the capsules and provides effective thermal coupling between the capsules and the walls of the coil 28 by means of the very effective heat transfer mechanisms of vaporization and condensation. Because this mechanism is inhibited by the presence of "inert" fluids, the well known refrigerator manufacturing step of purging should precede introduction of the vapor into the coil 28, and the liquid introduced to maintain saturation of the vapor should not substantially exceed that needed to maintain saturation at the highest temperature of interest. Skilled art workers will recognize that the heat transfer fluid introduced between the capsules 34 may comprise any one of the commercially available refrigerants, such as, for example, Freon.

If desired, and as illustrated in FIG. 4, saturated vapor may also be used to fill the void 38 intentionally introduced in the capsule 34 whereby expansion of the thermal storage medium 30 is accommodated. It will be apparent to skilled art workers that the vapor in the capsules 34 may be the same or different from the vapor used to fill the interstices between capsules 34.

Persons skilled in the art will recognize that compressor cycling is preferably a function of several parameters including temperature of the air conditioned space, temperature of the evaporator, "state" of the thermal storage medium, and vehicle operating mode. Of these four parameters only the last two require elaboration since the first two are the comfort and anti-icing parameters familiar in conventional prior art air conditioning systems. While these familiar parameters are not considered further herein, they do, of course, represent part of the information supplied to the cycling controller and are represented symbolically in FIG. 1 by icing sensor 61 and comfort sensor 63. It should also be noted that there is an optional connection 65 between comfort sensor 63 and fan speed controller 17 which supplies information for automatic fan control from the former to the latter.

In the preferred embodiment, the thermal storage medium is contained in capsules 34, each of which contains pure substances and/or mixtures of such substances such that the previously suggested storage level corresponding to "reserve to accommodate vehicular performance" is associated with one particular predetermined temperature and thus pressure of the saturated vapor which fills the interstices between capsules 34, while the substantially fused state is associated with another (lower) predetermined temperature and pressure, and these two pressures are sensed by sensor 41 and the resulting information is supplied to cycling controller 43 as instructions to turn the compressor "on" and "off" respectively. Since the actual device of sensor 41 is, in the preferred embodiment, a well known differential pressure switch which is activated by pressure in coil 28 and supplies an electrical signal to cycling controller 43, no further elaboration is necessary.

The vehicle operating mode parameters of interest are engine load and brake application. With respect to the former, it is reasonable to assume that the vehicle operator considers acceleration satisfactory at any accelerator position other than full travel and the preferred embodiment uses the familiar arrangement of a limit switch responsive to full travel to open-circuit the compressor clutch coil. This arrangement is represented by the engine load sensor 51 which, in alternate embodiments, can sense engine load in other ways well known to persons skilled in the art.

With respect to brake application, it is well known that the kinetic energy stored in a moving vehicle is converted to heat by the brakes and then dissipated in the environment. Thus any of this kinetic energy which can be diverted to thermal storage by the refrigeration system represents air conditioning free of any fuel burden. Such arrangements are particularly attractive for vehicles in stop-and-go service such as urban busses where a significant portion of the engine output is stored as kinetic energy in the vehicle and then dissipated as heat by the brakes. While special compressor driving arrangements which are beyond the scope of this invention may be needed to fully exploit the potential for "free" air conditioning, it is obvious that some benefit in this respect will result from just simply activating the compressor along with the brakes and that all that is needed as braking sensor 53 here is a simple electrical connection from the brake lamp circuit to cycling controller 43. Other braking sensors well known to persons skilled in the art may also be used.

In the matter of fuel conservation, which is one of the major objectives of this invention, the braking and engine load sensors described herein, while important in this respect, are merely first steps toward a vehicle system which coordinates operator intention, engine capability, vehicle operating mode, and accessory power requirements in such a way as to minimize fuel consumption. While the details of such coordination are beyond the scope of this invention, it is obvious to persons skilled in the art that the thermal storage arrangements of this invention serve to make such coordination possible, at least insofar as the air conditioner is concerned.

Referring now to FIG. 5, a modified thermal storage air conditioning system in accordance with the invention is shown. In FIG. 5, the coil 28, instead of housing the thermal storage medium constitutes a section of a brine loop 50. The thermal storage medium 52 is disposed in a remote storage tank 54, say in capsules 34, surrounded with suitable thermal insulation 56. A pump 58 is interposed in the brine loop. While the various sensors as well as the cycling controller detailed in the description of FIG. 1 have been duplicated in FIG. 5, skilled art workers will immediately recognize that not all of these devices are needed in every embodiment, and that selection of actual devices will be dictated by the application. Thus, for example, engine load detectors as well as brake application detectors can be omitted from systems intended for room air conditioning.

In the embodiment of FIG. 5, the additional thermal storage capacity of the thermal storage medium 52 is made available by actuating the pump 58 which circulates the brine in the loop 50 through the coil 28 and then into heat transfer relation with the remote storage tank 54. Skilled art workers will recognize that where the brine is circulated by means of thermosiphoning, control can be effected by substituting a valve for pump 58.

Whatever arrangement is employed, the embodiment of FIG. 5 is advantageous in that the thermal storage medium 52, being located remote from the unit 10, may be of sufficient size to store additional capacity on either a long or short term basis. While many of the advantages of short term storage have been discussed above with reference to FIGS. 1-4, long term storage provides yet additional benefits. Thus, the stored capacity can be used to augment the cooling capacity of the refrigeration system itself. Also, in applications such as the automobile where the compressor is driven by the engine, the additional stored capacity can be used to provide cooling when the engine is stopped. Also, in the case of air conditioning systems powered from utility lines, thermal capacity may be stored in the medium 52 during off-peak hours or other times when energy costs are low, and used later when energy costs are higher.

An additional advantage of the modification shown in FIG. 5 is that it allows the thermal storage medium to be selected from amongst those materials which, for physical or physiological reasons, are unsuitable for use in an embodiment such as that of FIG. 1. Thus, the embodiment of FIG. 5 permits isolation of, for example, a corrosive or noxious substance with desirable thermal storage properties. Clearly, rupturing of the coil 28, which merely contains the brine solution, would not be dangerous to the occupants of the conditioned space provided the brine is harmless and uncontaminated by the thermal storage medium. While no particular mention has been made of brine material because of the wide choice of suitable substances, one particularly attractive choice for both home and automobile use is automotive radiator coolant.

Skilled art workers will recognize that another important feature of the embodiment of FIG. 5 which results from a separate brine loop 28 in the evaporator 16 is an arrangement which makes it possible to limit initial purchase to a "conventional" air conditioner and to add remote storage later. While the "complete" system maintains evaporator temperature and thus inhibits moisture evaporation during compressor recycling as explained earlier, the "conventional" portion alone does not, and the obvious remedy of introducing thermal storage material directly into the evaporator portion of the brine loop complicates conversion to a FIG. 5 embodiment. Thus it may be preferable to introduce thermal storage capsules 34' directly into the evaporation portion of the refrigerant loop along with special screens or other means to hold them there. While direct introduction sacrifices "instant" cooling, such sacrifice may be acceptable in "room" air conditioners which are left on for longer periods of time than are those in automobiles and where the delay in full output, which may be a matter of several minutes, can be tolerated.

While the preferred embodiments of the present invention have now been described, skilled art workers will recognize that additional variations and modifications are possible, some of which will now be discussed. Thus, while fins 32 are shown in the drawings as parallel planes, this is not necessary, and other shapes such as, for example, corrugated fins, may be more desirable in particular applications. Further, while it is preferred that fins 32 serve the dual purpose of (a) thermally coupling the coils 18 and 28 and (b) effecting heat exchange between said first and second media and said air stream, other arrangements are also possible. For example, an assembly comprising the coils 18, 28 and a first heat exchanger for thermally coupling the coils, may be disposed remote from the air stream and heat exchange with the air stream effected by means of a second heat exchanger thermally coupled to the first heat exchanger and disposed in the air stream's flow path.

Similarly, while the arrangement of the coils 18, 28 depicted in FIG. 1 is preferred, a variety of other arrangements is possible, as long as the refrigerant in coil 18 and the thermal storage medium 30 in coil 28 are in heat transfer relation. Also, while the cross section of the coils 18, 28 have been depicted as circular, this is not mandatory, and other cross sections may be more desirable in certain applications. Therefore, the description of the coils 18, 28 as tubular is not intended to limit the coils to circular cross sections or any other particular cross sections. Similarly, while the capsules 34 in FIGS. 3 and 4 have been illustrated as being spherical, this too is not mandatory and other shapes such as cylindrical capsules having hemispherical ends may also be employed.

Further, while the preferred control system for cycling the compressor to regulate the quantity of storage capacity has been described above, the availability of other techniques for accomplishing the desired control should be recognized. For example, in those embodiments of the invention wherein the thermal storage medium 30 is not encapsulated but rather occupies substantially the entire volume of the coil 28, sensor 41 may comprise two thermal sensors disposed in the thermal storage medium 30. One sensor should be disposed at a point thermally remote from the coil 18, i.e. at the center of the coil 28, and the other at a point intermediate the first sensor and the wall of the coil 28, the exact location of the latter sensor being selected such that the fusing and melting of the medium 30 at this point corresponds to the desired apportioning of the medium between its two states.

When this alternative is employed, the compressor 20 will be activated if either sensor senses melting of the medium 30 and deactivated if both sensors sense fusion of the medium or if vehicular performance requirements as sensed, for example, by the throttle position, so demand. Skilled art workers will recognize that the first sensor is necessary to prevent compressor shut down when the unit 10 is first generating sufficient excess cooling capacity to fuse the thermal storage medium 30. Also apparent is the possibility of introducing additional sensors to provide finer control.

In the description above, it has been assumed that the thermal storage and release is effected by fusion and melting of the thermal storage medium and the heat of transition accompanying these changes in state.

While this is preferred, it will be obvious to those skilled in the art that storage and release can alternately be effected by changes involving the gaseous state. In fact, if desired, thermal storage and release may be effected without any change of state at all. For example, it may be desirable to employ a solid material having a heat of transition which is made available during a crystallographic change in the solid state. Working with materials in the solid state has the added advantage of minimizing corrosion and containment problems.

Also contemplated is treatment of the heat transfer surfaces. For example, etching, coating, etc. of these surfaces may be employed to increase wetting and/or thermal coupling.

Moreover, while the controllably coupled thermal storage unit 10 has been described above with particular reference to automobile air conditioning units, it also has a wide variety of other applications.

These include room air conditioners as well as residential and commercial units whose conventional sizing rules result in systems which produce discomfort when ambient temperatures are above or below a narrow "normal" range, the former because units cannot cope with the heat loads; the latter because moisture evaporation during cycling results in excessive humidity in the air conditioned space. Since the thermal storage arrangement of this invention inhibits evaporation by maintaining evaporator temperature when the compressor is stopped, the latter cause of discomfort is eliminated and systems can be sized to effectively control the temperature of the air conditioned space when ambients are high.

Moreover, while the invention has been described in conjunction with a compressor driven air conditioning system it will be apparent that it may be employed with equal success in an absorption type system. Also, the invention can alternately be incorporated in a heating system by effecting changes obvious to persons skilled in the art once the arrangements described herein are known. In such event, the thermal storage medium may comprise, for example, trisodiumphosphate dodecahydrate or the composition comprising 31–34% trisodiumphosphate, about 4–7% sodium hydroxide and the balance water. Other possibilities include lead acetate and $NaCH_3COO.3H_2O$.

Since these as well as other variations and modifications are within the scope of the present invention, descriptions contained herein should be construed as illustrative rather than limiting.

What is claimed is:

1. In a system for conditioning a stream of air to provide an output air stream having a controlled temperature, said system being of the type comprising means for producing an air stream, a first medium in heat exchange relation with said air stream and means for controlling the temperature of said medium to effect sufficient heat exchange between said medium and said air stream to maintain the temperature of said output air stream at said controlled temperature, the improvement in said system comprising:

a second medium having thermal storage capability;

thermal conducting means interposed between said first and second media for effecting heat exchange therebetween, at least a portion of said thermal conducting means being disposed in the path of said air stream for heat exchange therewith, said portion being arranged to permit passage of said stream therethrough;

means for controlling the flow rate of said air stream through said thermal conducting means portion for controllably apportioning heat transfer from said air stream and said second medium to said first medium when said means for controlling the temperature of said first medium is activated whereby when said means for controlling the temperature of said first medium is activated and said flow rate is increased there is increased heat transfer from said air stream to said first medium and decreased heat transfer from said second medium to said first medium and when said flow rate is decreased there is decreased heat transfer from said air stream to said first medium and increased heat transfer from said second medium to said first medium; and for controlling the rate of heat transfer from said air stream to said second medium when said means for controlling the temperature of said first medium is deactivated whereby when said first temperature controlling means is deactivated and said flow rate is increased there is increased heat transfer from said air stream to said second medium and when said flow rate is decreased there is decreased heat transfer from said air stream to said second medium; and cycling means operatively connected to said first medium temperature controlling means for effecting activation and deactivation thereof.

2. The system according to claim 1, and further comprising means for sensing the temperature of said output air stream and providing an output signal indicative thereof; and means responsive to said output signal and operatively connected to said cycling means for effecting activation and deactivation thereof, activation of said cycling means effecting activation of said first medium temperature control means and deactivation of said cycling means effecting deactivation of said first medium temperature control means.

3. The system according to claim 2, wherein said air stream flow rate controlling means is operatively connected to said temperature sensing means output signal to increase said flow rate when said output signal is above a preselected level and decrease said flow rate when said output signal is below a preselected level.

4. The system according to claim 1, and further comprising means for sensing the level of thermal storage effected by said second medium and providing an output signal indicative thereof; and
means responsive to said output signal and operatively connected to said cycling means for effecting activation and deactivation thereof, activation of said cycling means effecting activation of said first medium temperature control means and deactivation of said cycling means effecting deactivation of said first medium temperature control means.

5. The system according to claim 4, wherein said means for activating and deactivating said cycling means deactivates said cycling means when said thermal storage level sensing means output signal exceeds a preselected level and activates said cycling means when said thermal storage level sensing means output signal is less than said preselected level.

6. The system according to claim 5, wherein said thermal conducting means comprises:
a first tubular coil containing said first medium;
a second tubular coil in heat transfer relation with said thermal storage medium, said second coil being disposed with the turns thereof in juxtaposed relation to the turns of said first coil; and
a plurality of thermally conductive substantially planar members connected to said first and second coils and disposed in the flow path of said air stream, said planar members being arranged with the planes thereof substantially perpendicular to the axes of said coils and substantially parallel to the direction of air flow.

7. The system according to claim 6, wherein said second coil is an endless coil and wherein said thermal storage medium is disposed in said second coil.

8. The system according to claim 7, and further comprising a plurality of capsules disposed in said second coil, said thermal storage medium being disposed in said capsules.

9. The system according to claim 8, and further comprising a thermal coupling medium disposed in the interstitial space between said capsules for effecting heat transfer between said capsules and the walls of said second coil.

10. The system according to claim 9, wherein said thermal coupling medium is a saturated vapor.

11. The system according to claim 10, wherein the output signal provided by said thermal storage level sensing means is a function of the temperature of said second medium.

12. The system according to claim 11, wherein said thermal storage level sensing means comprises means for sensing the pressure of the saturated vapor disposed in said interstitial space.

13. The system according to claim 8, wherein said thermal storage medium occupies less than the entire volume in said capsules to provide expansion space for said thermal storage medium.

14. The system according to claim 13, wherein said expansion space is filled with saturated vapor.

15. The system according to claim 8, wherein different thermal storage media are disposed in different capsules.

16. The system according to claim 6, wherein a fluid heat exchange medium is disposed in said second coil, and further comprising:
container means for housing said thermal storage medium, said container means being disposed remote from the flow path of said air stream and in heat transfer relation with said second coil; and
means for circulating said fluid heat exchange medium through said second coil.

17. The system according to claim 16, wherein said circulating means is a pump.

18. The system according to claim 16, wherein said circulating means comprises means for effecting thermosiphoning, and a valve for controlling circulation of said fluid exchange medium.

19. The system according to claim 16, wherein said container means comprises a chamber for housing said thermal storage medium and thermal insulating material in surrounding relation with said chamber.

20. The system according to claim 16, wherein said container means and said circulating means are removably secured to the remainder of said system.

21. The system according to claim 16, wherein said fluid heat exchange medium is a conventional automotive coolant.

22. The system according to claim 6,
wherein said first medium comprises a refrigerant;
wherein said means for controlling the temperature of said refrigerant comprises a compressor for said refrigerant; a condenser, fluid connections between the output of said compressor and the input of said condenser, the output of said condenser being connected to one end of said first coil; and pressure control means disposed in said one end of said first coil to maintain a differential between the pressure in said condenser and the pressure in said first coil, the other end of said first coil being connected to the input of said compressor; and
wherein said cycling means comprises means for activating and deactivating said compressor.

23. The system according to claim 1, wherein said means for controlling the flow rate of said air stream comprises an adjustable speed fan.

24. The system according to claim 1, wherein said means for controlling the flow rate of said air stream comprises louver means disposed in the flow path of said air stream, said louver means being movable between a position in which the flow of said air stream through said thermal conducting means portion is obstructed and a position in which the flow of said air stream through said thermal conducting means portion is substantially unobstructed.

25. The system according to claim 1, wherein said thermal storage medium effects thermal storage and release by transition between a liquid state and a solid state.

26. The system according to claim 25, wherein said thermal storage medium is formic acid.

27. The system according to claim 1, wherein said thermal storage medium effects thermal storage and release by transition between a gaseous state and a liquid state.

28. The system according to claim 1, wherein said thermal storage medium effects thermal storage by transition between one solid state and another solid state.

29. The system according to claim 28, wherein said transition is crystallographic.

30. In a system adapted for incorporation in a motor vehicle having a passenger area for conditioning a stream of air to provide an output air stream having a controlled temperature to said passenger area, said system being of the type comprising means for producing an air stream, a refrigerant, a compressor for said refrigerant, means for coupling said compressor to the engine of said vehicle to be driven thereby, a condenser for liquifying said refrigerant, fluid connections between the output of said compressor and the input of said condenser, an evaporator coil having one end connected to the output of said condenser and the other end connected to the input of said compressor and pressure control means disposed in said one end of said evaporator coil to maintain a differential between the pressure in said condenser and the pressure in said coil, the improvement in said system comprising:

a medium having thermal storage capacity;

thermal conducting means interposed between said evaporator coil and said thermal storage medium for effecting heat exchange therebetween, at least a portion of said thermal conducting means being disposed in the path of said air stream for heat exchange therewith, said portion being arranged to permit passage of said air stream therethrough;

cycling means operatively connected to said coupling means for effecting activation and deactivation thereof, activation of said cycling means effecting coupling of said compressor to said engine and deactivation of said cycling means effecting decoupling of said compressor to said engine; and means for controlling the flow rate of said air stream through said thermal conducting means portion for controllably apportioning heat transfer from said air stream and said medium to said refrigerant when said compressor is coupled to said engine whereby when said flow rate is increased there is increased heat transfer from said air stream to said refrigerant and decreased heat transfer from said medium to said refrigerant and when said flow rate is decreased there is decreased heat transfer from said air stream to said refrigerant an increased heat transfer from said medium to said refrigerant, and for controlling the rate of heat transfer from said air stream to said medium when said compressor is decoupled from said engine whereby when said flow rate is increased there is increased heat transfer from said air stream to said medium and when said flow rate is decreased there is decreased heat transfer from said air stream to said medium.

31. The system according to claim 30, and further comprising means for sensing the level of thermal storage effected by said second medium and providing an output signal indicative thereof; and means responsive to said output signal and operatively connected to said cycling means for activating said cycling means when the level of thermal storage is below a preselected level and deactivating said cycling means when the level of thermal storage is above a preselected level.

32. The system according to claim 30, and further comprising means for sensing the temperature of said output air stream and providing an output signal indicative thereof; and means responsive to said output signal and operatively connected to said cycling means for activating said cycling means when the temperature of said output air stream is above a preselected level and deactivating said cycling means when the temperature of said output air stream is below a preselected level.

33. The system according to claim 30, and further comprising means for detecting the load on said engine and for providing an output signal indicative thereof; and means responsive to said output signal and operatively connected to said cycling means for activating said cycling means when the load on said engine is below a preselected level and deactivating said cycling means when the load on said engine is above a preselected level.

34. The system according to claim 30, and further comprising means for detecting braking of said motor vehicle and for providing an output signal indicative thereof; and means responsive to said braking detector output signal and operatively connected to said cycling means for activating said cycling means during braking of said vehicle and deactivating said cycling means when said vehicle is not braking.

* * * * *